United States Patent
Li et al.

(10) Patent No.: US 12,493,410 B2
(45) Date of Patent: Dec. 9, 2025

(54) ACCELERATING SYSTEM BOOT TIMES VIA HOST-MANAGED DEVICE MEMORY

(71) Applicant: INTEL CORPORATION, Santa Clara, CA (US)

(72) Inventors: Kevin Yufu Li, Shanghai (CN); Zhenfu Chai, Shanghai (CN); Lei Zhu, Shanghai (CN); Junjie He, Shanghai (CN); Shijie Liu, Shanghai (CN); Tao Xu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 15 days.

(21) Appl. No.: 17/997,030

(22) PCT Filed: May 22, 2020

(86) PCT No.: PCT/CN2020/091722
§ 371 (c)(1),
(2) Date: Oct. 25, 2022

(87) PCT Pub. No.: WO2021/232396
PCT Pub. Date: Nov. 25, 2021

(65) Prior Publication Data
US 2023/0176735 A1    Jun. 8, 2023

(51) Int. Cl.
*G06F 3/06* (2006.01)
(52) U.S. Cl.
CPC ............ *G06F 3/061* (2013.01); *G06F 3/0632* (2013.01); *G06F 3/0673* (2013.01)

(58) Field of Classification Search
CPC ...... G06F 3/061; G06F 3/0632; G06F 3/0673; G06F 9/4401
(Continued)

(56) References Cited

U.S. PATENT DOCUMENTS

| | | | |
|---|---|---|---|
| 2008/0005549 A1 | 1/2008 | Ke | |
| 2009/0158023 A1* | 6/2009 | Kern | G06F 9/4401 713/2 |

(Continued)

FOREIGN PATENT DOCUMENTS

| | | |
|---|---|---|
| CN | 101097522 A | 1/2008 |
| CN | 104115136 A | 10/2014 |
| CN | 110659221 A | 1/2020 |

OTHER PUBLICATIONS

International Search Report and Written Opinion for Application No. PCT/CN2020/091722, mailed Feb. 22, 2021, 9 pages.
(Continued)

*Primary Examiner* — Hashem Farrokh
(74) *Attorney, Agent, or Firm* — Hanley, Flight & Zimmerman, LLC (57) ABSTRACT

Systems, apparatuses and methods may provide for technology that initializes a host-managed device memory (HDM) as a temporary proxy for a system memory, wherein the HDM is associated with an accelerator. The technology also creates a shadow copy of boot firmware code in the HDM and executes one or more boot instructions in the shadow copy of the boot firmware code. In one example, the one or more boot instructions are to be one or more of executed before an initialization of the system memory or executed in parallel with the initialization of the system memory.

25 Claims, 6 Drawing Sheets

(58) Field of Classification Search
USPC .......................................................... 711/154
See application file for complete search history.

(56) References Cited

U.S. PATENT DOCUMENTS

| | | | |
|---|---|---|---|
| 2013/0326206 A1 | 12/2013 | Lueck et al. | |
| 2015/0310044 A1* | 10/2015 | Isaacson | G06F 16/256 |
| | | | 707/613 |
| 2016/0117225 A1* | 4/2016 | Yu | G06F 11/1666 |
| | | | 714/15 |
| 2017/0052896 A1 | 2/2017 | Nachimuthu et al. | |
| 2017/0371834 A1* | 12/2017 | Pignatelli | G06F 9/441 |
| 2019/0042279 A1* | 2/2019 | Rothman | G06F 1/3287 |
| 2019/0050335 A1 | 2/2019 | Natu et al. | |
| 2021/0373790 A1* | 12/2021 | Henderson | G06F 3/0604 |

OTHER PUBLICATIONS

Compute Express Link Consortium, Inc., "Compute ExPress Link", Jun. 2019, Revision 1.1, 250 pages.

* cited by examiner

ACCELERATING SYSTEM BOOT TIMES VIA HOST-MANAGED DEVICE MEMORY

CROSS REFERENCE TO RELATED APPLICATIONS

The present application is a U.S. National Phase Patent Application, which claims the benefit of priority to International Patent Application No. PCT/CN2020/091722 filed on May 22, 2020.

TECHNICAL FIELD

Embodiments generally relate to the booting of computer architectures. More particularly, embodiments relate to accelerating boot times via host-managed device memory (HDM).

BACKGROUND

When a computing system is booted, UEFI (Unified Extensible Firmware Interface, e.g., basic input output system/BIOS) firmware instructions may be transferred from SPI (serial peripheral interface) flash memory to the cache of a CPU (central processing unit) for execution until the UEFI firmware initializes system memory (e.g., volatile memory coupled to the CPU). Once the system memory initialization is complete, the UEFI firmware may be "shadowed" into the system memory for further execution by the CPU. If the size of the cache is limited, however, such an approach may involve frequent fetches from the SPI flash memory during system memory initialization, which may have a negative impact on performance. Indeed, the performance impact may be worsened if the size of the system memory is relatively large and the memory initialization process takes significant amount of time.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Recent developments in computer architectures provide for the direct connection between an accelerator (e.g., special-purpose field-programmable gate array/FPGA, application specific integrated circuit/ASIC) and a host processor (e.g., CPU) of the computing system via a low-latency, high-bandwidth interface such as a CXL (Compute Express Link, e.g., CXL Specification, Rev. 1.1, June 2019, Compute Express Link Consortium) interface. The accelerator may include a host-managed device memory (HDM) that is kept coherent with the other memory in the computing system. In one example, the accelerator interface is a discrete or on-package link that supports dynamic protocol multiplexing of coherency, memory access, and input/output (IO) protocols. In such a case, the interface enables the accelerator to access system memory as a caching agent.

In general, the accelerator interface may be leveraged on client and/or server platforms to enhance various capabilities. For example, the accelerator may be designed to support cache mode, memory mode and IO mode, where these work modes are combined to achieve different goals. In one example, the accelerator interface is connected to host processor ports, which support a protocol such as, for example, the CXL protocol. The accelerator may be designed as on-board device or as a card to be inserted into slots connected to the host processor ports.

Figure 1:
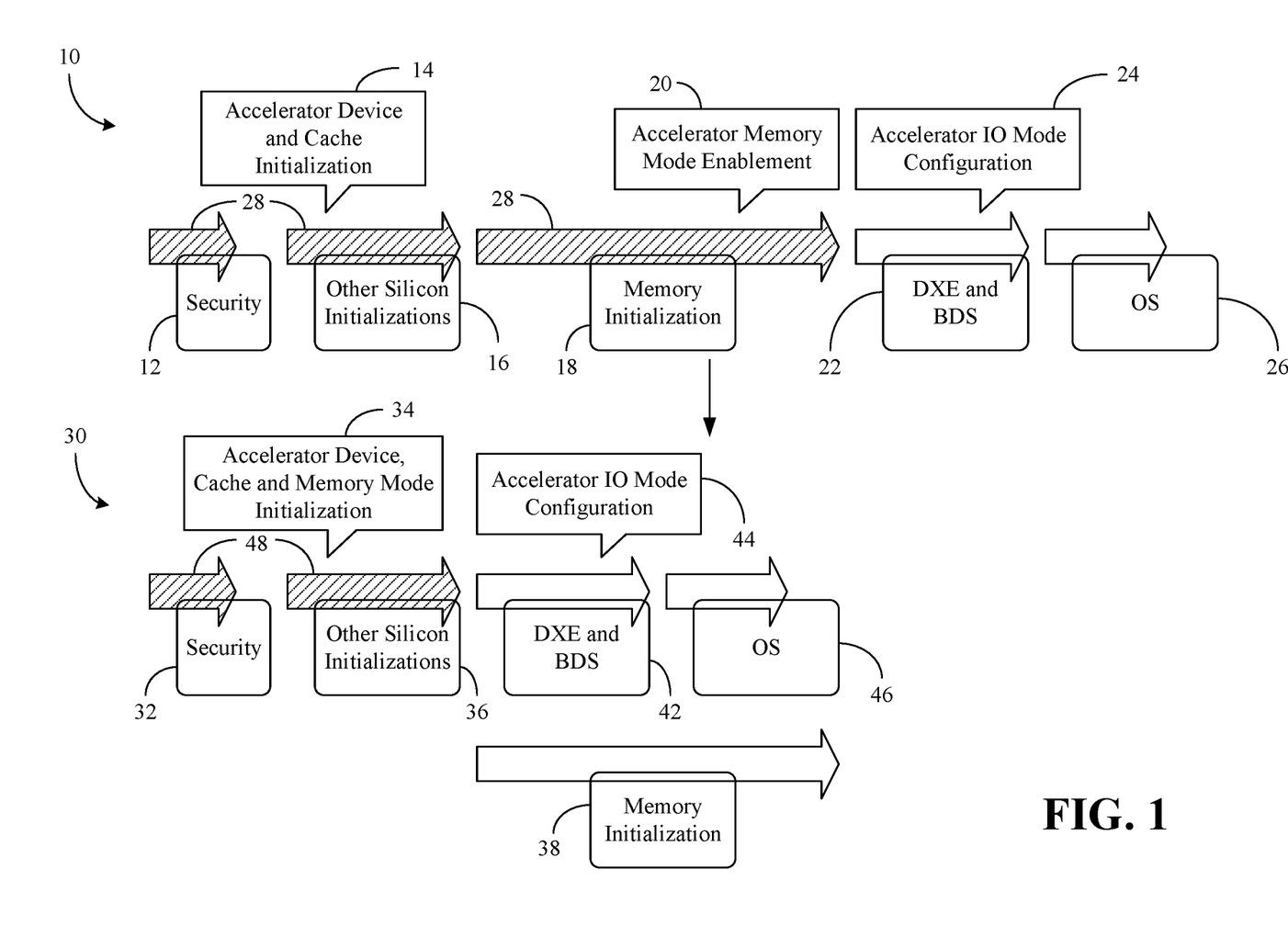
FIG. 1 is a comparative block diagram of an example of a conventional boot timeline and a boot timeline according to an embodiment.

Turning now to FIG. 1, a conventional boot timeline 10 is shown in which a security phase 12 is followed by device and cache initialization 14 of an accelerator and one or more other silicon initialization phases 16 of a host processor connected to the accelerator. In general, the device and cache initialization 14 may include link training, CXL access enabling, CXL device enumeration, CXL device capability discovery, and CXL cache mode enabling. The illustrated other silicon initialization phase(s) 16 are followed by a system memory initialization phase 18 that concludes with an accelerator memory mode enablement 20. The illustrated accelerator memory mode enablement 20 is followed by a driver execution environment (DXE) and boot device selection (BDS) phase 22, accelerator IO mode configuration 24, and operating system (OS) phase 26.

Of particular note is that the portion of the conventional boot timeline 10 before completion of the accelerator memory mode enablement 20—illustrated by arrows 28—may involve the indirect transfer (e.g., through a platform controller hub/PCH or other IO module) of UEFI firmware instructions from a SPI flash memory to the CPU cache for execution. If the size of the cache is limited, such an approach may involve frequent fetches from the SPI flash memory during the system memory initialization phase 18, which may have a negative impact on performance. Indeed, the performance impact may be worsened if the size of the system memory is relatively large and the memory initialization phase 18 takes significant amount of time to complete.

By contrast, an enhanced boot timeline 30 includes a security phase 32 that is followed by an early initialization 34 of the accelerator and one or more other silicon initialization phases 36 of the host processor. In an embodiment, the early initialization 34 includes the memory mode enablement 20 in addition to accelerator access enabling, accelerator enumeration, accelerator capability discovery, and accelerator cache mode enabling. As will be discussed in greater detail, by enabling the memory mode early (e.g., pre-EFI initialization/PEI of the HDM), the HDM may be used as a temporary "proxy" (e.g., alternative, substitute, replacement) for the system memory until the system memory is initialized. For example, a shadow copy of the boot firmware code may be created in the HDM, where boot instructions may be executed from the shadow copy rather than the SPI flash memory and/or the host processor cache.

In general, initialization of the HDM may be completed much more quickly (e.g., within 1 s) than the system memory. Thus, a system memory initialization phase 38 may be conducted in parallel with a DXE and BDS phase 42, an accelerator IO mode configuration 44 and/or an OS phase 46. The portion of the enhanced boot timeline 30 before completion of the other silicon initialization phases 36—illustrated by arrows 48—that may involve the indirect transfer (e.g., through a PCH or other IO module) of UEFI firmware instructions from the SPI flash memory to the CPU cache for execution may be relatively short compared to the conventional boot timeline 10. Thus, the enhanced boot timeline 30 improves performance, particularly when the size of the cache is limited and/or the size of the system memory is relatively large.

Figure 2:
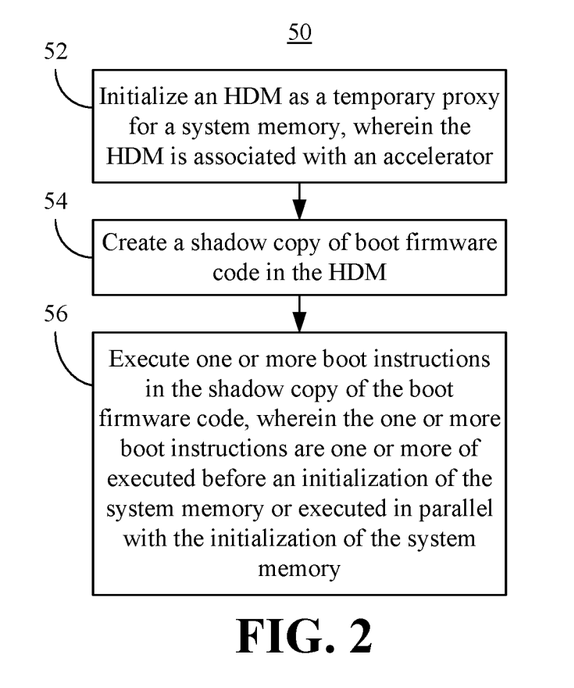
FIG. 2 is a flowchart of an example of a method of operating a host processor according to an embodiment.

FIG. 2 shows a method 50 of operating a host processor. The method 50 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), FPGAs, complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 50 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 52 provides for initializing an HDM as a temporary proxy for a system memory, wherein the HDM is associated with an accelerator (e.g., a "CXL device"). In an embodiment, block 52 includes enabling a memory mode in the HDM. Block 52 may also involve confirming that the HDM supports operation as the temporary proxy before initializing the HDM as the temporary proxy. To confirm that the HDM supports operation as the temporary proxy, block 52 might detect a hardware initialization flag (e.g., hw_mode=1) in the accelerator. If the HDM is initialized by a UEFI driver or OS driver (e.g., hw_mode=0), block 52 may confirm that the HDM supports operation as the temporary proxy by detecting an identifier (ID) in a white list, where the ID corresponds to the accelerator.

More particularly, because UEFI drivers and OS drivers may typically be unable to execute in the PEI phase, accelerator designers may provide memory PEI code, with the accelerator being added to the white list (e.g., each kind of accelerator has an individual identification—VID and Serial Number). UEFI firmware may add the information to help automatically identify whether the accelerator supports the early HDM initialization. Even though there may be some time cost for the memory initialization on these kinds of accelerators, the duration may still be much less than the normal system memory initialization.

Illustrated block 54 creates a shadow copy of boot firmware code in the HDM, where block 56 provides for execution of one or more boot instructions (e.g., DXE instructions, BDS instructions, accelerator IO mode instructions, OS instructions, etc., or any combination thereof) in the shadow copy of the boot firmware code. In the illustrated example, the boot instruction(s) are one or more of executed before an initialization of the system memory or executed in parallel with the initialization of the system memory (e.g., not after the initialization of the system memory). The method 50 therefore enhances performance by accelerating boot time (e.g., eliminating dependencies between the execution of the boot instruction(s) and completion of the system memory initialization).

Figure 3A:
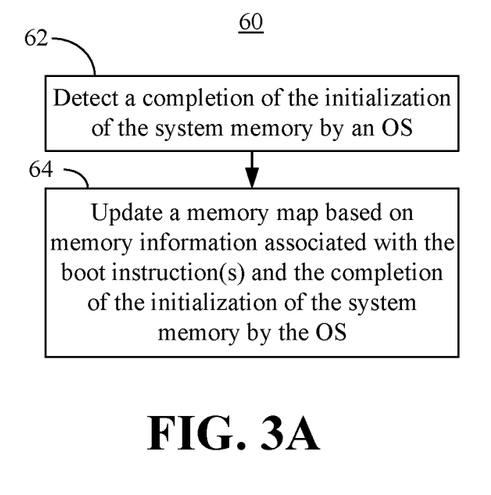
FIGS. 3A and 3B are flowcharts of examples of methods of managing a memory map according to embodiments.

FIG. 3A shows a method 60 of managing a memory map when the boot instruction(s) are executed before the initialization of the system memory. The method 60 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 62 provides for detecting a completion of the initialization of the system memory by an OS. In an embodiment, a memory map is updated at block 64 based on memory information associated with the boot instruction(s) and the completion of the initialization of the system memory by the OS. The illustrated method 60 therefore significantly reduces the POST (power-on self-test) time.

Figure 3B:
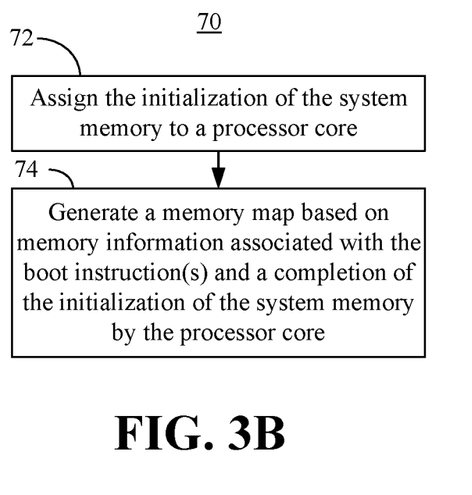

FIG. 3B shows a method 70 of managing a memory map when the boot instruction(s) are executed in parallel with the initialization of the system memory. The method 70 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 72 assigns the initialization of the system memory to a processor core. In an embodiment, a memory map is generated at block 74 based on memory information associated with the boot instruction(s) and a completion of the initialization of the system memory by the processor core. Thus, the illustrated method 70 waits for the system memory to be initialized before generating the memory map and booting to the OS. While the POST time reduction (e.g., the duration of the DXE and BDS phase) may not be reduced as much as in the case of the method 60 (FIG. 3A), generating the memory map at block 74 may be more straightforward than updating the memory map at block 64 (FIG. 3A).

Figure 4:
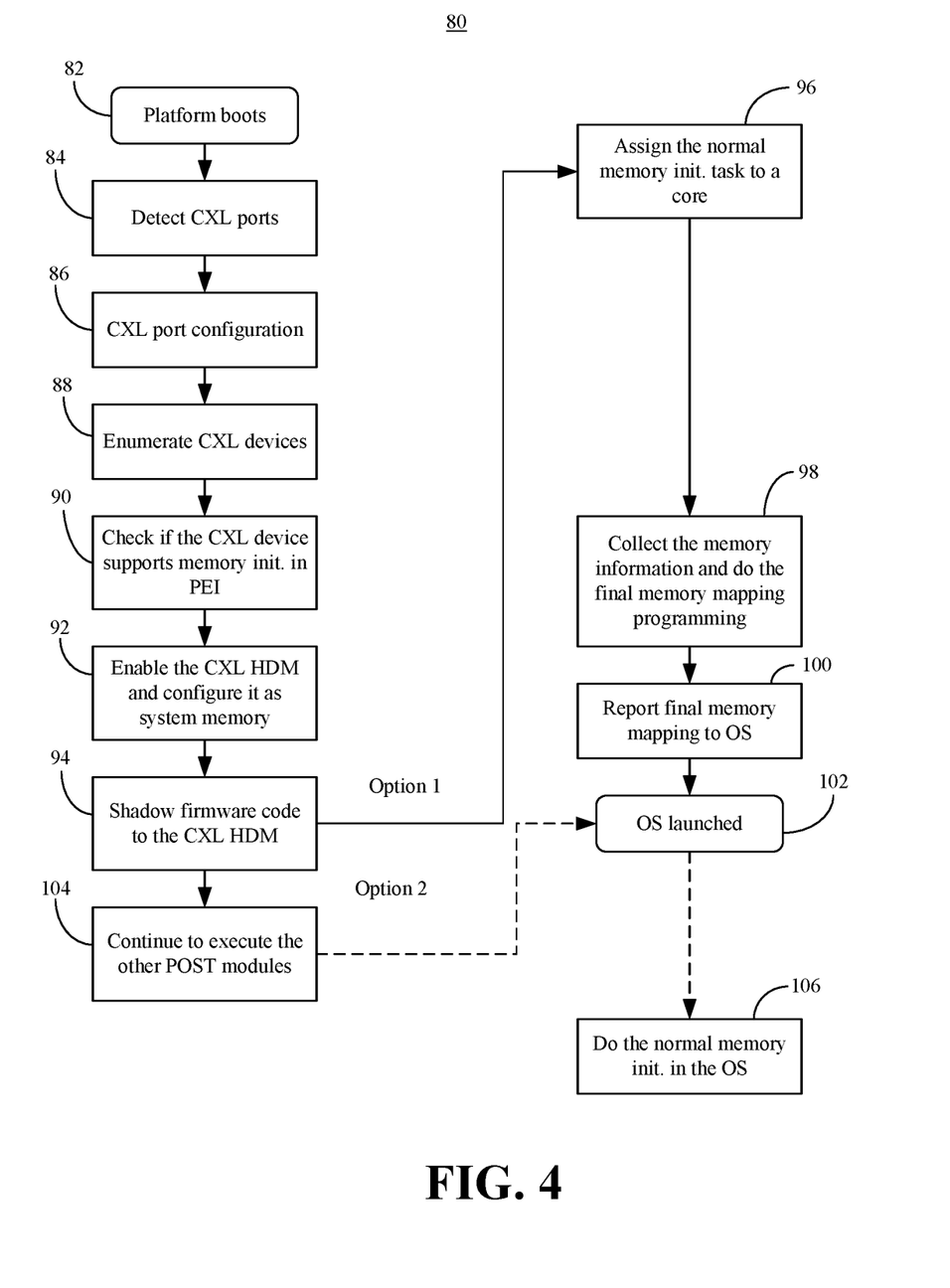
FIG. 4 is a flowchart of an example of a method of operating a performance-enhanced computing system according to an embodiment.

FIG. 4 shows a method 80 of operating a performance-enhanced computing system. The method 80 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

The platform begins to boot at illustrated processing block 82, where block 84 detects CXL ports after IO links are trained. A CXL port configuration may be conducted at block 86. In one example, block 88 enumerates the CXL devices, where a check is performed at block 90 as to whether the CXL device supports memory initialization in PEI. Thus, block 90 may determine whether a hardware initialization flag is set (e.g., hw_mode=1) or whether the CXL device is present in a white list (e.g., when hw_mode=0). In an embodiment, block 92 enables the CXL HDM and configures/publishes the HDM as system memory. Block 94 shadows the firmware code to the CXL HDM.

In illustrated "Option 1", the normal initialization task is assigned to a processor core at block 96. Thus, a boot strapped processor (BSP) may continue mainstream execution from the HDM while the normal memory initialization is implemented in the assigned core. Additionally, block 98 may collect memory information and conduct the final memory mapping programming. In this example, the final memory mapping is reported to the OS at block 100 and the OS launches at block 102.

In illustrated "Option 2", block 104 continues to execute the other POST modules, where the OS is launched at block 102. Additionally, the normal memory initialization may be conducted in the OS at block 106. Thus, blocks 90, 92, 94, 96, 98, 100, and 106 provide substantial advantages over conventional solutions in terms of accelerated boot times and/or enhanced performance.

Figure 5:
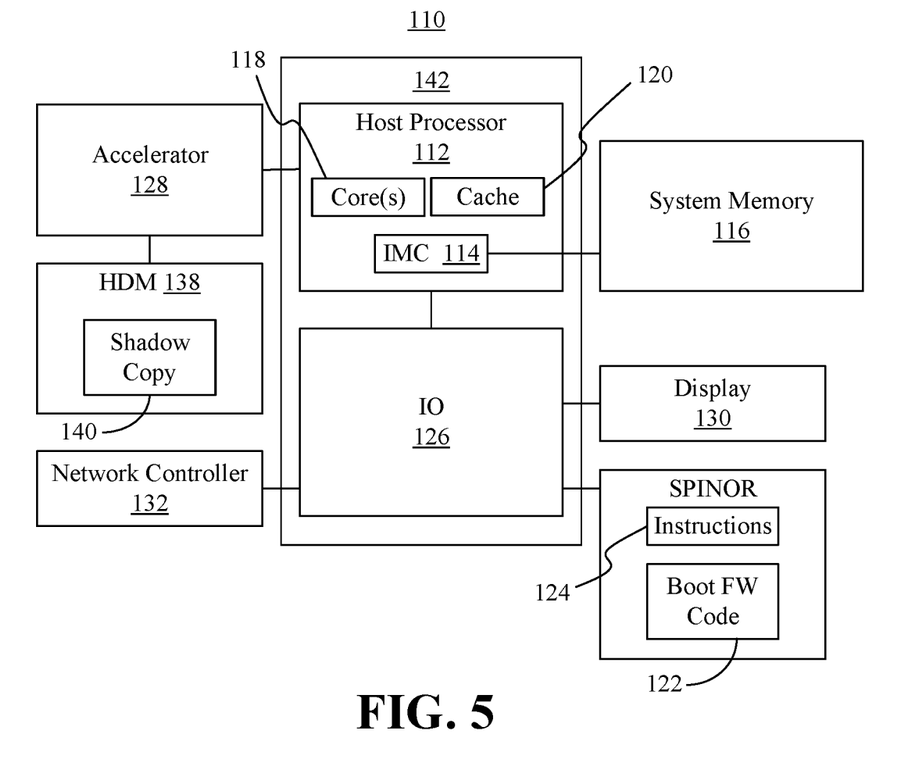
FIG. 5 is a block diagram of an example of a performance-enhanced computing system according to an embodiment.

Turning now to FIG. 5, a performance-enhanced computing system 110 is shown. The system 110 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), Internet of Things (IoT) functionality, etc., or any combination thereof.

In the illustrated example, the system 110 includes a host processor 112 (e.g., CPU) having an integrated memory controller (IMC) 114 that is coupled to a system memory 116 (e.g., dual inline memory module/DIMM). The illustrated host processor 112 also includes one or more cores 118 and a cache 120 (e.g., last level cache/LLC). In an embodiment, an IO module 126 is coupled to the host processor 112. The illustrated IO module 126 communicates with, for example, a display 130 (e.g., touch screen, liquid crystal display/LCD, light emitting diode/LED display), a network controller 132 (e.g., wired and/or wireless), and a SPINOR 134 (e.g., SPI flash memory or other non-volatile memory device) containing boot firmware (FW) code 122 (e.g., including a set of boot instructions such as DXE or BDS instructions). The host processor 112 may be combined with the IO module 126 into a system on chip (SoC) 142. The illustrated system 110 also includes an accelerator 128 coupled to the host processor 112 via an interface 136 such as, for example, a CXL interface, a Peripheral Component Interconnect Express (PCI-e, e.g., PCI EXPRESS Base Specification 5.0, Version 1.0, May 28, 2019, PCI Special Interest Group) interface, etc., or any combination thereof. The accelerator 128 may also be coupled to (or include) an HDM 138.

In an embodiment, the host processor 112 executes a set of program instructions 124 retrieved from the SPINOR 134 to perform one or more aspects of the method 50 (FIG. 2), the method 60 (FIG. 3A), the method 70 (FIG. 3B) and/or the method 80 (FIG. 4), already discussed. Thus, execution of the program instructions 124 may cause the host processor 112 to initialize the HDM 138 as a temporary proxy for the system memory 116 and create a shadow copy 140 of the boot FW code 122 in the HDM 138. Additionally, execution of the program instructions 124 may cause the host processor 112 to execute one or more boot instructions in the shadow copy 140 of the boot FW code 122. In one example, the boot instruction(s) are executed before an initialization of the system memory 116 and/or in parallel with the initialization of the system memory 116.

The system 110 is therefore considered performance-enhanced at least to the extent that operation of the HDM 138 as a temporary proxy for the system memory 116 reduces the boot time of the computing system 110. Such performance advantages may be particularly significant if the size of the system memory 116 is relatively large and/or the size of the cache 120 is constrained. For example, the illustrated solution limits the number of boot firmware code 122 fetches from the SPINOR 134 into the cache 120.

Figure 6:
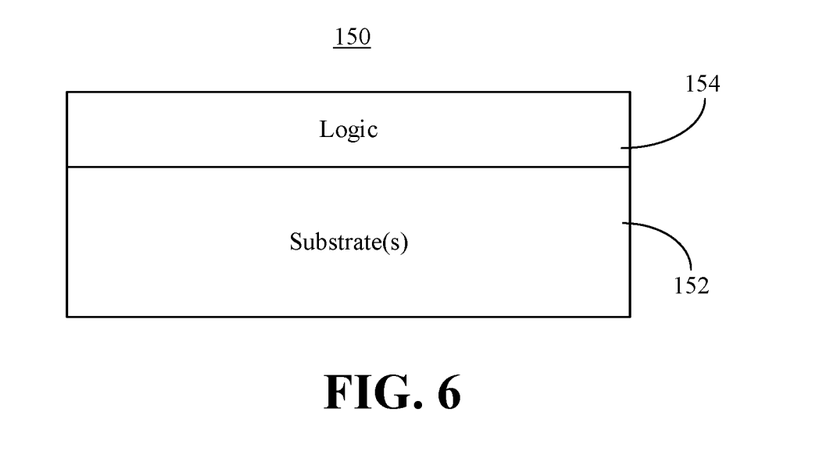
FIG. 6 is an illustration of an example of a semiconductor package apparatus according to an embodiment.

FIG. 6 shows a semiconductor apparatus 150 (e.g., chip, die, package). The illustrated apparatus 150 includes one or more substrates 152 (e.g., silicon, sapphire, gallium arsenide) and logic 154 (e.g., transistor array and other integrated circuit/IC components) coupled to the substrate(s) 152. In an embodiment, the logic 154 implements one or more aspects of the method 50 (FIG. 2), the method 60 (FIG. 3A), the method 70 (FIG. 3B) and/or the method 80 (FIG. 4), already discussed. Thus, the logic 154 may initialize an HDM as a temporary proxy for a system memory, wherein the HDM is associated with an accelerator. In an embodiment, the logic 154 also creates a shadow copy of boot firmware code in the HDM and executes one or more boot instructions in the shadow copy of the boot firmware code. As already noted, the one or more boot instructions may be one or more of executed before an initialization of the system memory or executed in parallel with the initialization of the system memory. The apparatus 150 is therefore considered to be performance-enhanced at least to the extent that operating the HDM as a temporary proxy for the system memory reduces boot time.

The logic 154 may be implemented at least partly in configurable logic or fixed-functionality hardware logic. In one example, the logic 154 includes transistor channel regions that are positioned (e.g., embedded) within the substrate(s) 152. Thus, the interface between the logic 154 and the substrate(s) 152 may not be an abrupt junction. The logic 154 may also be considered to include an epitaxial layer that is grown on an initial wafer of the substrate(s) 152.

Figure 7:
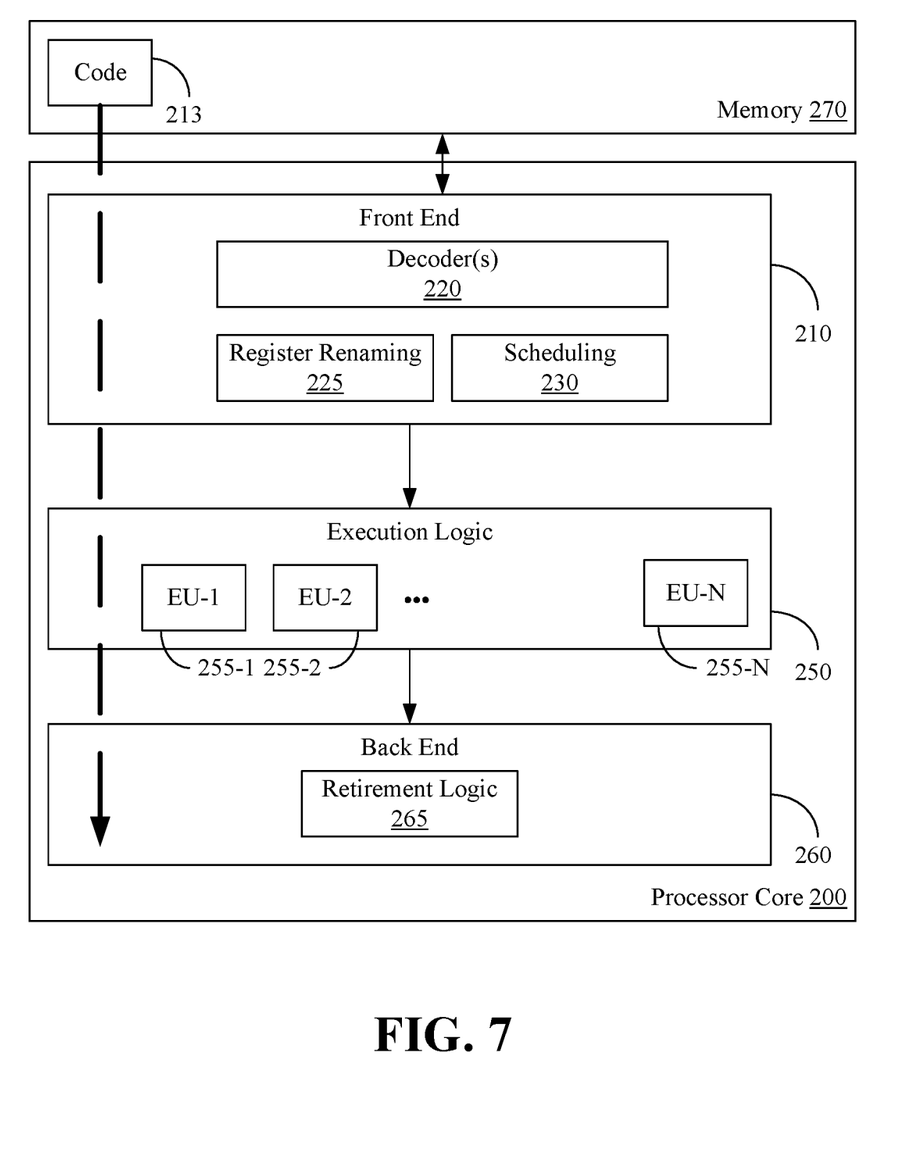
FIG. 7 is a block diagram of an example of a processor according to an embodiment.

FIG. 7 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 7, a processing element may alternatively include more than one of the processor core 200 illustrated in FIG. 7. The processor core 200 may be a single-threaded core or, for at least one embodiment, the processor core 200 may be multithreaded in that it may include more than one hardware thread context (or "logical processor") per core.

FIG. 7 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 50 (FIG. 2), the method 60 (FIG. 3A), the method 70 (FIG. 3B) and/or the method 80 (FIG. 4), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 7, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 8:
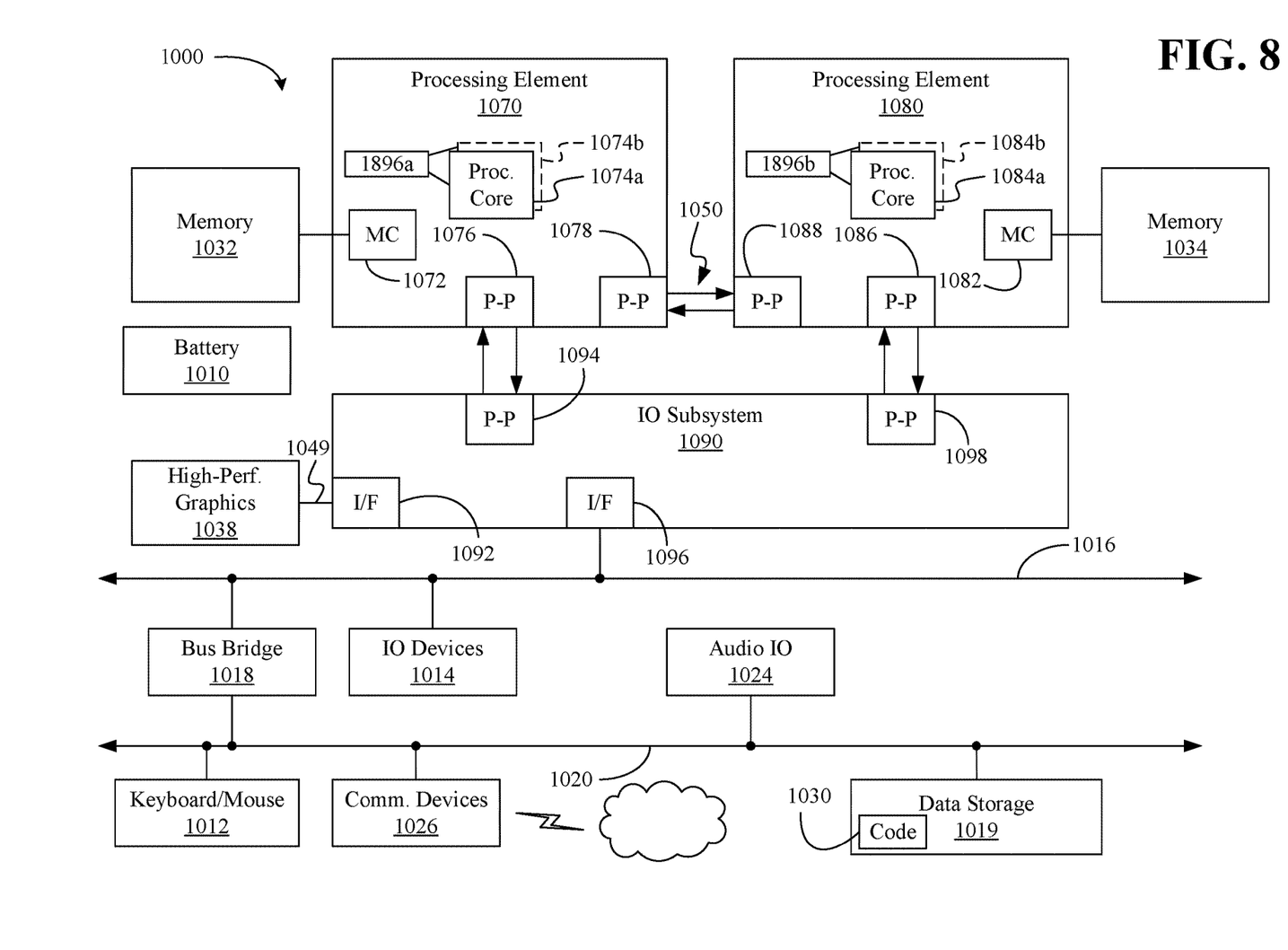
FIG. 8 is a block diagram of an example of a multi-processor based computing system according to an embodiment.

Referring now to FIG. 8, shown is a block diagram of a computing system 1000 embodiment in accordance with an embodiment. Shown in FIG. 8 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 8 may be implemented as a multi-drop bus rather than point-to-point interconnect.

As shown in FIG. 8, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 7.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 8, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 8, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 8, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 50 (FIG. 2), the method 60 (FIG. 3A), the method 70 (FIG. 3B) and/or the method 80 (FIG. 4), already discussed, and may be similar to the code 213 (FIG. 7), already discussed. Further, an audio I/O 1024 may be coupled to second bus 1020 and a battery 1010 may supply power to the computing system 1000.

Note that other embodiments are contemplated. For example, instead of the point-to-point architecture of FIG. 8, a system may implement a multi-drop bus or another such communication topology. Also, the elements of FIG. 8 may alternatively be partitioned using more or fewer integrated chips than shown in FIG. 8.

ADDITIONAL NOTES AND EXAMPLES

Example 1 includes a performance-enhanced computing system comprising a host processor, an accelerator coupled to the host processor, wherein the accelerator includes a host-managed device memory (HDM), a system memory, and a non-volatile memory device including a set of executable program instructions, which when executed by the host processor, cause the host processor to initialize the HDM as a temporary proxy for the system memory, create a shadow copy of the boot firmware code in the HDM, and execute one or more boot instructions in the shadow copy of the boot firmware code, wherein the one or more boot instructions are to be executed one or more of before initialization of the system memory or in parallel with the initialization of the system memory.

Example 2 includes the computing system of Example 1, wherein the program instructions, when executed, further cause the host processor to confirm that the HDM supports operation of the HDM as the temporary proxy before initializing the HDM as the temporary proxy.

Example 3 includes the computing system of Example 2, wherein to confirm that the HDM supports operation of the HDM as the temporary proxy, the program instructions, when executed, cause the host processor to detect one or more of a hardware initialization flag in the accelerator or an identifier in a white list, and wherein the identifier corresponds to the accelerator.

Example 4 includes the computing system of Example 1, wherein to initialize the HDM as the temporary proxy, the program instructions, when executed, cause the host processor to enable a memory mode in the HDM.

Example 5 includes the computing system of any one of Examples 1 to 4, to wherein the one or more boot instructions are to include driver execution environment phase instructions.

Example 6 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to initialize a host-managed device memory (HDM) as a temporary proxy for a system memory, wherein the HDM is associated with an accelerator, create a shadow copy of boot firmware code in the HDM, and execute one or more boot instructions in the shadow copy of the boot firmware code, wherein the one or more boot instructions are to be one or more of executed before an initialization of the system memory or executed in parallel with the initialization of the system memory.

Example 7 includes the semiconductor apparatus of Example 6, wherein the logic coupled to the one or more substrates is to confirm that the HDM supports operation of the HDM as the temporary proxy before initializing the HDM as the temporary proxy.

Example 8 includes the semiconductor apparatus of Example 7, wherein to confirm that the HDM supports operation of the HDM as the temporary proxy, the logic coupled to the one or more substrates is to detect one or more of a hardware initialization flag in the accelerator or an identifier in a white list, and wherein the identifier corresponds to the accelerator.

Example 9 includes the semiconductor apparatus of Example 6, wherein to initialize the HDM as the temporary proxy, the logic coupled to the one or more substrates is to enable a memory mode in the HDM.

Example 10 includes the semiconductor apparatus of Example 6, wherein the one or more boot instructions are to be executed before the initialization of the system memory, and wherein the logic coupled to the one or more substrates is to detect a completion of the initialization of the system memory by an operating system (OS), and update a memory map based on memory information associated with the one or more boot instructions and the completion of the initialization of the system memory by the OS.

Example 11 includes the semiconductor apparatus of Example 6, wherein the one or more boot instructions are to be executed in parallel with the initialization of the system memory, and wherein the logic coupled to the one or more substrates is to assign the initialization of the system memory to a processor core, and generate a memory map based on memory information associated with the one or more boot instructions and a completion of the initialization of the system memory by the processor core.

Example 12 includes the semiconductor apparatus of any one of Examples 16 to 11, wherein the one or more boot instructions are to include driver execution environment phase instructions.

Example 13 includes the semiconductor apparatus of any one of Examples 16 to 11, wherein the logic coupled to the one or more substrates includes transistor channel regions that are positioned within the one or more substrates.

Example 14 includes at least one computer readable storage medium comprising a set of executable program instructions, which when executed by a host processor, cause the host processor to initialize a host-managed device memory (HDM) as a temporary proxy for a system memory, wherein the HDM is associated with an accelerator, create a shadow copy of boot firmware code in the HDM, and execute one or more boot instructions in the shadow copy of the boot firmware code, wherein the one or more boot instructions are to be one or more of executed before an initialization of the system memory or executed in parallel with the initialization of the system memory.

Example 15 includes the at least one computer readable storage medium of Example 14, wherein the program instructions, when executed, further cause the host processor to confirm that the HDM supports operation of the HDM as the temporary proxy before initializing the HDM as the temporary proxy.

Example 16 includes the at least one computer readable storage medium of Example 15, wherein to confirm that the HDM supports operation of the HDM as the temporary proxy, the program instructions, when executed, cause the host processor to detect one or more of a hardware initialization flag in the accelerator or an identifier in a white list, and wherein the identifier corresponds to the accelerator.

Example 17 includes the at least one computer readable storage medium of Example 14, wherein to initialize the HDM as the temporary proxy, the program instructions, when executed, cause the host processor to enable a memory mode in the HDM.

Example 18 includes the at least one computer readable storage medium of Example 14, wherein the one or more boot instructions are to be executed before the initialization of the system memory, and wherein the program instructions, when executed, further cause the host processor to detect a completion of the initialization of the system memory by an operating system (OS), and update a memory map based on memory information associated with the one or more boot instructions and the completion of the initialization of the system memory by the OS.

Example 19 includes the at least one computer readable storage medium of Example 14, wherein the one or more boot instructions are to be executed in parallel with the initialization of the system memory, and wherein the instructions, when executed, further cause the host processor to assign the initialization of the system memory to a processor core, and generate a memory map based on memory information associated with the one or more boot instructions and a completion of the initialization of the system memory by the processor core.

Example 20 includes the at least one computer readable storage medium of any one of Examples 14 to 19, wherein the one or more boot instructions are to include driver execution environment phase instructions.

Example 21 includes a method of operating a host processor, the method comprising initializing a host-managed device memory (HDM) as a temporary proxy for a system memory, wherein the HDM is associated with an accelerator, creating a shadow copy of boot firmware code in the HDM, and executing one or more boot instructions in the shadow copy of the boot firmware code, wherein the one or more boot instructions are one or more of executed before an initialization of the system memory or executed in parallel with the initialization of the system memory.

Example 22 includes the method of Example 21, further including confirming that the HDM supports operation of the HDM as the temporary proxy before initializing the HDM as the temporary proxy.

Example 23 includes the method of Example 22, wherein confirming that the HDM supports operation of the HDM as the temporary proxy includes detecting one or more of a hardware initialization flag in the accelerator or an identifier in a white list, and wherein the identifier corresponds to the accelerator.

Example 24 includes the method of Example 21, wherein initializing the HDM as the temporary proxy includes enabling a memory mode in the HDM.

Example 25 includes the method of any one of Examples 21 to 24, wherein the one or more boot instructions include driver execution environment phase instructions.

Example 26 includes means for performing the method of any one of Examples 12 to 25.

Thus, technology described herein may fully leverage the memory attribution of CXL devices by firmware. If a platform (e.g., client or server platforms) connects to a CXL device that supports early-memory initialization, UEFI firmware may be shadowed to the CXL HDM (e.g., configured as system memory). The HDM initialization occurs much sooner and the normal memory initialization may be nearly eliminated from the duration of the boot process. The technology also greatly releases the pressure on the limited cache size, as most of the code may be executed in CXL HDM. The technology significantly improves the boot performance of the platform. Moreover, the technology expands CXL device usage.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
a host processor circuit;
an accelerator circuit coupled to the host processor circuit, the accelerator circuit including host-managed device memory (HDM);
system memory; and
non-volatile memory including instruction to cause the host processor circuit to:
  initialize the HDM as a temporary proxy for the system memory until the system memory is initialized;
  create a shadow copy of boot firmware code in the HDM;
  execute one or more boot instructions in the shadow copy of the boot firmware code, the one or more boot instructions to be executed before an initialization of the system memory;
  detect a completion of the initialization of the system memory by an operating system (OS); and
  update a memory map based on memory information associated with the one or more boot instructions and the completion of the initialization of the system memory by the OS.

2. The system of claim 1, wherein the instructions cause the host processor circuit to confirm that the HDM supports operation of the HDM as the temporary proxy before initializing the HDM as the temporary proxy.

3. The system of claim 2, wherein to confirm that the HDM supports operation of the HDM as the temporary proxy, the instructions cause the host processor circuit to detect one or more of a hardware initialization flag in the accelerator circuit or an identifier in a white list, the identifier corresponding to the accelerator circuit.

4. The system of claim 1, wherein to initialize the HDM as the temporary proxy, the instructions cause the host processor circuit to enable a memory mode in the HDM.

5. The system of claim 1, wherein the one or more boot instructions include driver execution environment phase instructions.

6. The system of claim 1, wherein the instructions cause the host processor circuit to:
  enumerate at least one device coupled to the host processor circuit via at least one port, the at least one device including the accelerator circuit; and
  based on confirming that the accelerator circuit supports operation of the HDM as the temporary proxy, initialize the HDM as the temporary proxy.

7. A semiconductor apparatus comprising:
one or more substrates; and
logic circuitry coupled to the one or more substrates, the logic circuitry including one or more of configurable logic circuitry or fixed-functionality hardware logic circuitry, the logic circuitry to:
  initialize host-managed device memory (HDM) as a temporary proxy for system memory until the system memory is initialized, the HDM associated with an accelerator circuit;
  create a shadow copy of boot firmware code in the HDM;
  execute one or more boot instructions in the shadow copy of the boot firmware code, the one or more boot instructions to be executed in parallel with the initialization of the system memory;
  assign the initialization of the system memory to a processor core; and
  generate a memory map based on memory information associated with the one or more boot instructions and a completion of the initialization of the system memory by the processor core.

8. The semiconductor apparatus of claim 7, wherein the logic circuitry is to confirm that the HDM supports operation of the HDM as the temporary proxy before initializing the HDM as the temporary proxy.

9. The semiconductor apparatus of claim 8, wherein to confirm that the HDM supports operation of the HDM as the temporary proxy, the logic circuitry is to detect one or more of a hardware initialization flag in the accelerator circuit or an identifier in a white list, the identifier corresponding to the accelerator circuit.

10. The semiconductor apparatus of claim 7, wherein to initialize the HDM as the temporary proxy, the logic circuitry is to enable a memory mode in the HDM.

11. The semiconductor apparatus of claim 7, wherein the one or more boot instructions include driver execution environment phase instructions.

12. The semiconductor apparatus of claim 7, wherein the logic circuitry includes transistor channel regions that are positioned within the one or more substrates.

13. The semiconductor apparatus of claim 7, wherein the logic circuitry is to:
  enumerate at least one device coupled to the logic circuitry via at least one port, the at least one device including the accelerator circuit; and
  based on confirming that the accelerator circuit supports operation of the HDM as the temporary proxy, initialize the HDM as the temporary proxy.

14. At least one computer readable storage medium comprising instructions to cause a host processor circuit to:
  initialize host-managed device memory (HDM) as a temporary proxy for system memory until the system memory is initialized, the HDM associated with an accelerator circuit;
  create a shadow copy of boot firmware code in the HDM;
  execute one or more boot instructions in the shadow copy of the boot firmware code, the one or more boot instructions to be executed before an initialization of the system memory;
  detect a completion of the initialization of the system memory by an operating system (OS); and
  update a memory map based on memory information associated with the one or more boot instructions and the completion of the initialization of the system memory by the OS.

15. The at least one computer readable storage medium of claim 14, wherein the instructions cause the host processor circuit to confirm that the HDM supports operation of the HDM as the temporary proxy before initializing the HDM as the temporary proxy.

16. The at least one computer readable storage medium of claim 15, wherein to confirm that the HDM supports operation of the HDM as the temporary proxy, the instructions cause the host processor circuit to detect one or more of a hardware initialization flag in the accelerator circuit or an identifier in a white list, the identifier corresponding to the accelerator circuit.

17. The at least one computer readable storage medium of claim 14, wherein to initialize the HDM as the temporary proxy, the instructions cause the host processor circuit to enable a memory mode in the HDM.

18. The at least one computer readable storage medium of claim 14, wherein the one or more boot instructions include driver execution environment phase instructions.

19. The at least one computer readable storage medium of claim 14, wherein the instructions cause the host processor circuit to:
   enumerate at least one device coupled to the host processor circuit via at least one port, the at least one device including the accelerator circuit; and
   based on confirming that the accelerator circuit supports operation of the HDM as the temporary proxy, initialize the HDM as the temporary proxy.

20. A method comprising:
   initializing, by executing an instructions with a host processor circuit, host-managed device memory (HDM) as a temporary proxy for system memory until the system memory is initialized, the HDM associated with an accelerator circuit;
   creating, by executing an instruction with the host processor circuit, a shadow copy of boot firmware code in the HDM;
   executing, with the host processor circuit, one or more boot instructions in the shadow copy of the boot firmware code, the one or more boot instructions executed in parallel with the initialization of the system memory;
   assigning, by executing an instruction with the host processor circuit, the initialization of the system memory to a processor core; and
   generating, by executing an instruction with the host processor circuit, a memory map based on memory information associated with the one or more boot instructions and a completion of the initialization of the system memory by the processor core.

21. The method of claim 20, including confirming that the HDM supports operation of the HDM as the temporary proxy before initializing the HDM as the temporary proxy.

22. The method of claim 21, wherein confirming that the HDM supports operation of the HDM as the temporary proxy includes detecting one or more of a hardware initialization flag in the accelerator circuit or an identifier in a white list, the identifier corresponding to the accelerator circuit.

23. The method of claim 20, wherein initializing the HDM as the temporary proxy includes enabling a memory mode in the HDM.

24. The method of claim 20, wherein the one or more boot instructions include driver execution environment phase instructions.

25. The method of claim 20, including:
   enumerating at least one device coupled to the host processor circuit via at least one port, the at least one device including the accelerator circuit; and
   based on confirming that the accelerator circuit supports operation of the HDM as the temporary proxy, initialize the HDM as the temporary proxy.

* * * * *